United States Patent
Daoud

[19]

[11] Patent Number: 6,055,146
[45] Date of Patent: Apr. 25, 2000

[54] WIRING PROTECTION AND RETENTION ARRANGEMENT WITHOUT FEED THROUGH

[75] Inventor: Bassel Hage Daoud, Parsippany, N.J.

[73] Assignee: Lucent Technologies Inc., Murray Hill, N.J.

[21] Appl. No.: 09/103,238

[22] Filed: Jun. 23, 1998

[51] Int. Cl.[7] .................................................. H02H 5/04
[52] U.S. Cl. .................................... 361/103; 379/327
[58] Field of Search ................................ 439/49, 50, 621;
361/58, 57, 91, 103, 104, 111, 117, 124,
626, 628, 630; 379/326–328, 330, 331

[56] References Cited

U.S. PATENT DOCUMENTS

| | | | |
|---|---|---|---|
| 4,516,818 | 5/1985 | Johnston et al. | 439/135 |
| 4,731,501 | 3/1988 | Clark et al. | 174/65 R |

*Primary Examiner*—Ronald W. Leja
*Attorney, Agent, or Firm*—Gibbons, Del Deo, Dolan Griffinger & Vecchione

[57] ABSTRACT

In a building entrance protector having an input wire termination device and an output wire termination device, a barrier wall for isolating fusible link connections between the input wire termination device and the output wire termination device. The barrier wall comprising a fire-resistant plate for isolating the input wire termination device from the output wire termination device within the building entrance protector. The fire-resistant plate has a narrow opening comprised of a primary aperture and a wiring access slot. The wiring access slot permits insertion of terminated fusible links into the primary aperture which is capable of containing the fusible link connections between the input wire termination device and the output wire termination device.

16 Claims, 5 Drawing Sheets

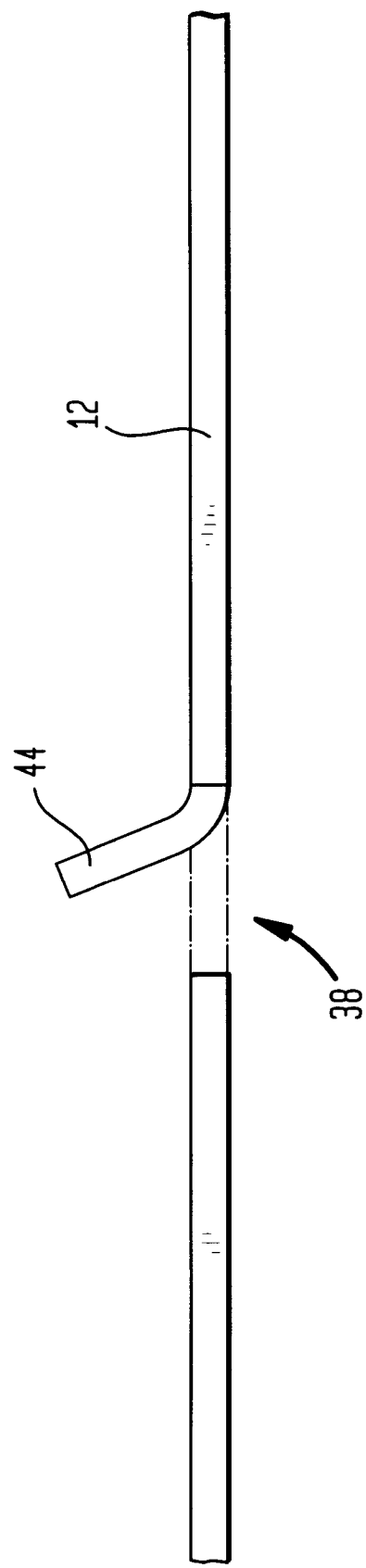

WIRING PROTECTION AND RETENTION ARRANGEMENT WITHOUT FEED THROUGH

CROSS REFERENCE TO RELATED APPLICATIONS

This application is related to copending U.S. patent application Ser. No. 09/102,938, filed on Jun. 23, 1998, entitled "SWIVEL CABLE MOUNTING ARRANGEMENT REQUIRING NO WIRING FEED THROUGH HOLE" having common inventors and a common assignee.

FIELD OF THE INVENTION

The present invention relates to building entrance protectors for telecommunication lines, and more particularly to the wiring systems for connecting components of the entrance protectors.

BACKGROUND OF THE INVENTION

Building entrance protector (BEP) is the name used in the art of telephone equipment to describe the junction box where telephone lines from outside plant wiring are joined to customer premises equipment. In the most common application, the building entrance protector is the place where the telecommunication lines from an outside plant wiring enter a building and are joined to the communication system within that building. Within the building entrance protector there is an input wire termination device that receives the telecommunication lines contained within the outside plant wiring. Also contained within the building entrance protector is an output wire termination device that receives the telecommunication lines required for the customer premises equipment Located in between the input wire termination device and the output wire termination device, passing through a barrier wall, are fusible links. The fusible links are typically 26 gauge copper wire, which is thinner than the gauge of either the outside plant wiring or the customer premises equipment.

The purpose of the fusible links is to prevent power surges from passing through the building entrance protector that can damage equipment located within the building or melt any wire on the customer side of the building entrance protector. Since telecommunication lines are frequently located on the same poles as power lines, a break in a power line that subsequently contacts a telephone line, can result in a large surge of power passing through the telecommunication lines into a building. Similarly, lightning strikes can result large surges of power pass in through telecommunication lines into a building. The purpose of the building entrance protector is to ensure that any such power surge is stopped at the point of the building entrance protector and is thus prevented from traveling into the building where it can cause damage to equipment and possibly a fire.

Typical wiring connections from the input wire termination device to the output wire termination device are made by hand or using hand tools. Hand wiring is time consuming and problematic.

Accordingly, there is a need for automating the wiring from the input wire termination device to the output wire termination device.

SUMMARY OF THE INVENTION

The present invention is a building entrance protector with wiring harness protection and retention arrangement for automatic wiring process without a feed through hole requirement. In the building entrance protector having an input wire termination device and an output wire termination device, a barrier wall for isolates fusible link connections between the input wire termination device and the output wire termination device. The barrier wall comprising a fire-resistant plate for isolating the input wire termination device from the output wire termination device within the building entrance protector. The fire-resistant plate has a narrow opening comprised of a primary aperture and a wiring access slot. The wiring access slot permits insertion of terminated fusible links into the primary aperture which is capable of containing the fusible link connections between the input wire termination device and the output wire termination device. A method in accordance with the present invention is also described.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Figure 1:
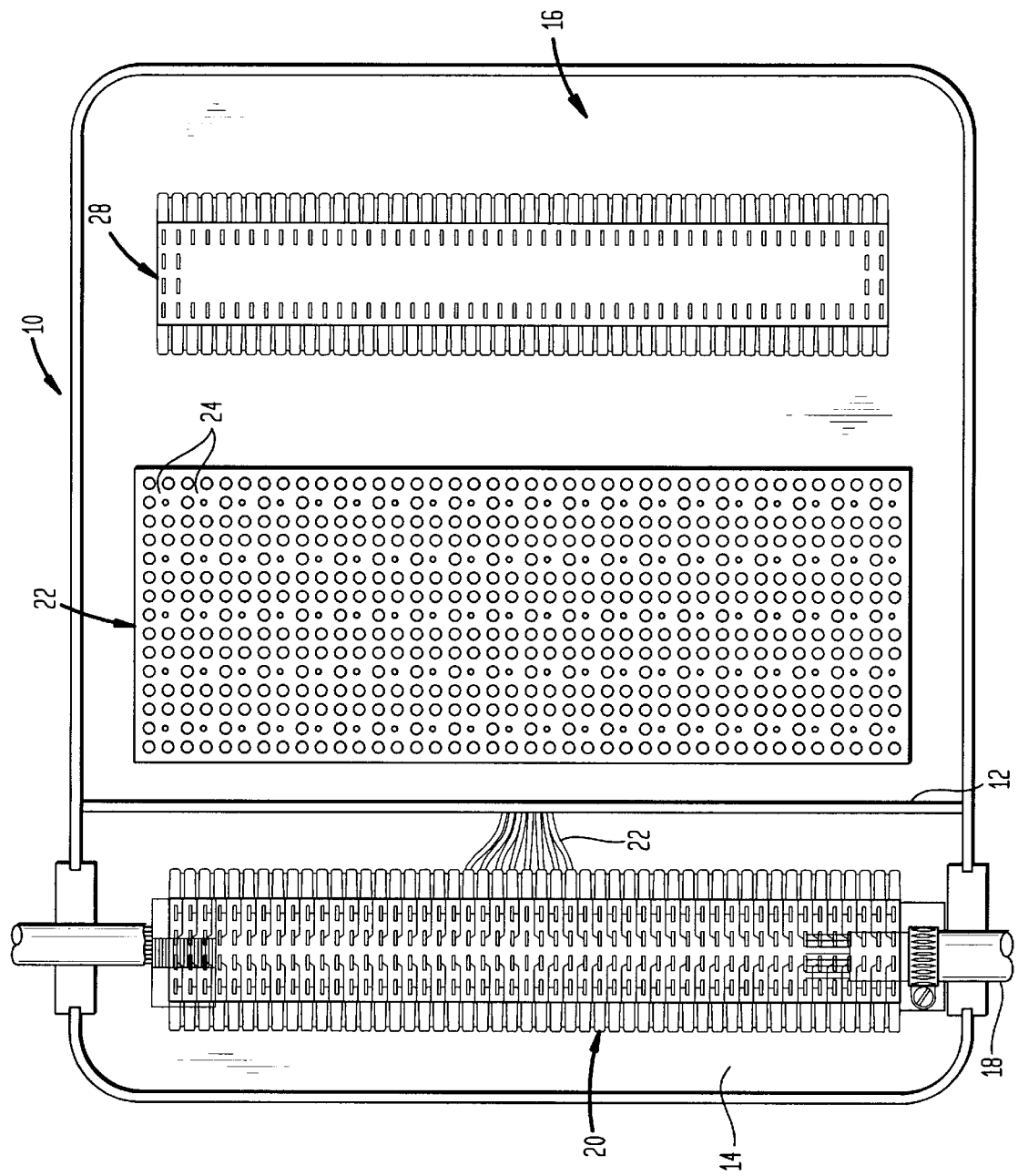
FIG. 1 is a top view of a building entrance protector (BEP) with wiring harness protection and retention arrangement for automatic wiring process without a feed through hole requirement.

Referring to FIG. 1, there is shown the present invention building entrance protector (BEP) with wiring harness protection and retention arrangement for automatic wiring process without a feed through hole requirement 10. The BEP for automatic wiring 10 contains a fire-resistant barrier wall 12 which separates a sealed fire-resistant splice chamber 14 and a distribution chamber 16. Outside plant wiring 18 passes into the sealed fire-resistant splice chamber 14. Within the sealed fire-resistant splice chamber 14, some of the individual wires contained within the outside plant wiring 18 are connected to an input wire termination device 20. A fusible link 22 connects an individual wire from the input termination device 20 to a corresponding individual surge protector port 24 located on a surge protector panel 26. The individual surge protector ports 24 are coupled to an output wire termination device 28, such as a punch down block. Customer premise equipment is connected to the output wire termination device 28.

Figure 2:
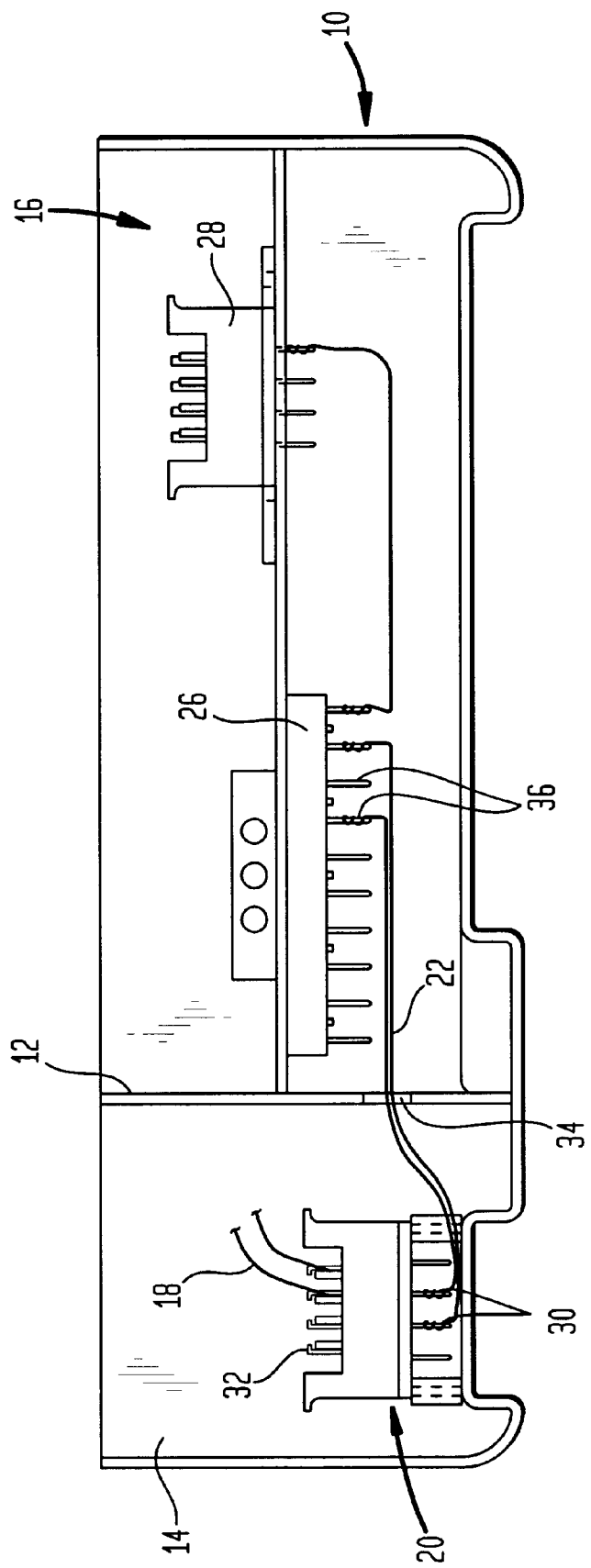
FIG. 2 is a cross sectional view of the BEP for automatic wiring.

Referring to FIG. 2, which is a cross-sectional view of the BEP for automatic wiring 10 shown in FIG. 1, it can be seen that the fusible links 22 are connected to terminal leads 30 on the bottom of the input wire termination device 20. The outside plant wiring 18 is connected to terminal leads 32 on the top of the input wire termination device 20. The fusible links 22 extend through a narrow opening 34 in the fire-resistant barrier wall 12 which separates the sealed fire-resistant splice chamber 14 and the distribution chamber 16 and connect to terminals 36 on the bottom of the surge protector panel 26.

Figure 3A:
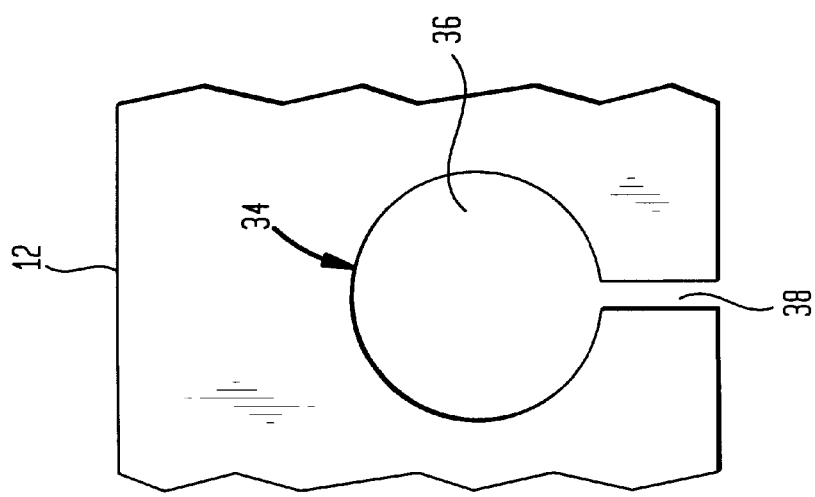
FIGS. 3a, 3b and 3c shows details of alternate embodiments of the narrow opening in the fire-resistant barrier wall.
Figure 3B:
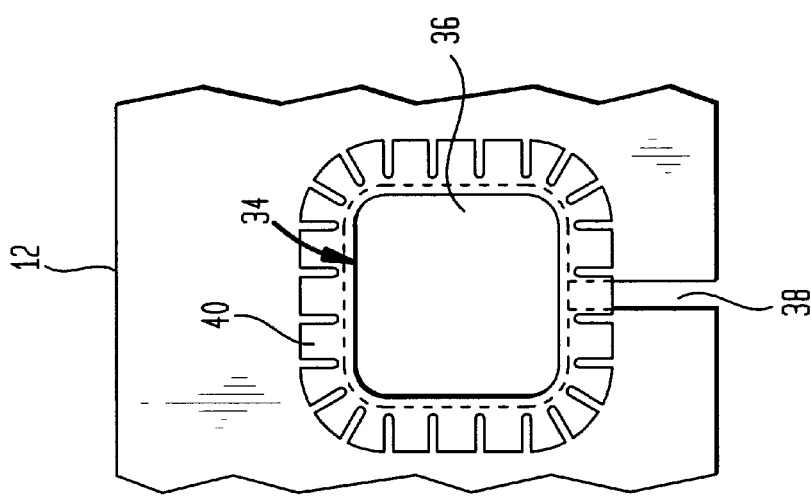
Figure 3C:
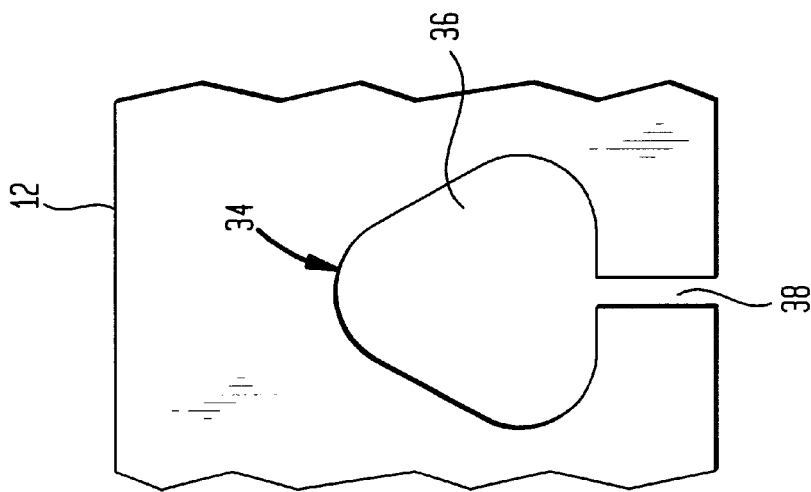

Referring to FIGS. 3a, 3b and 3c there are shown details of alternate embodiments of the narrow opening 34 in the fire-resistant barrier wall 12 which separates the sealed fire-resistant splice chamber 14 and the distribution chamber 16. The narrow opening 34 is comprised of two portions, a primary aperture 36 and a wiring access slot 38. FIGS. 3b, 3c and 3d show some of the possible shapes for the primary aperture 36. In particular FIG. 3a shows a circular shaped primary aperture 36, FIG. 3b shows a rounded square primary aperture 36, and FIG. 3c shows a rounded triangle primary aperture 36. In FIG. 3b there is shown a slotted rubber grommet 40 which is used to contain and protect the fusible links 22 (shown in FIGS. 1 and 2) which pass through the primary aperture 36 in the fire-resistant barrier wall 12. Alternatively, a grommet strip, cable tie, vinyl tape as well as other means may be used to contain and protect the fusible links 22 when they pass through the primary aperture 36.

Figure 4C:
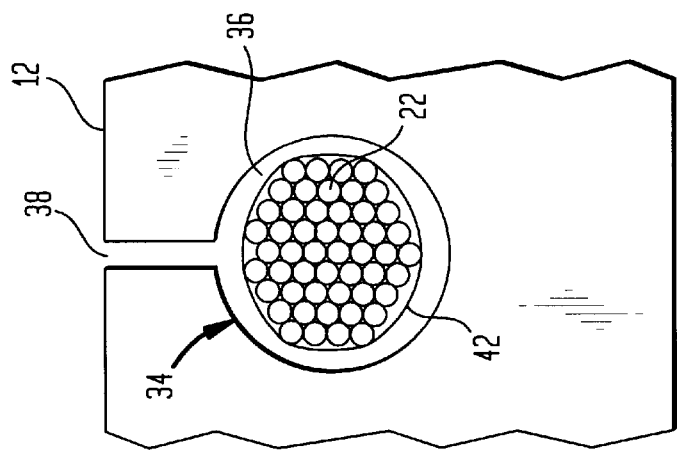
FIGS. 4a, 4b and 4c show a sequence of insertion of terminated fusible links into the narrow opening; and, FIG. 5 shows an edge view an alternate embodiment of the fire-resistant barrier wall.
Figure 4B:
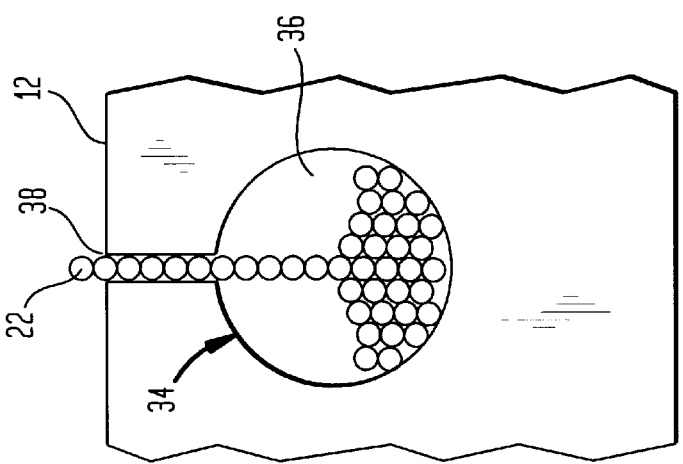
Figure 4A:
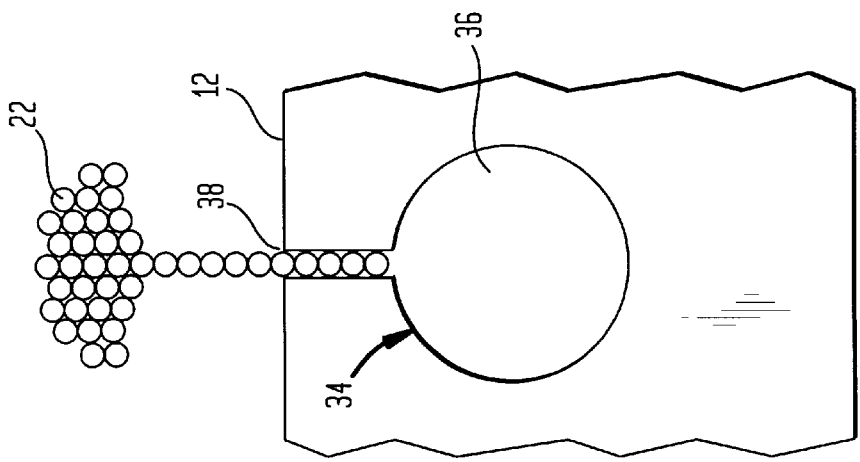

The fusible link 22 (shown in FIGS. 1 and 2) connects an individual wire from the input termination device 20 to a corresponding individual surge protector port 24 located on a surge protector panel 26. Utilizing an automatic wire-wrapping device, or other suitable automatic wire termination device, the fusible links 22 are automatically connected to individual terminal leads 30 on the bottom of the input wire termination device 20 and then are automatically connected to individual terminals 36 on the bottom of the surge protector panel 26. After the high speed automatic termination of the ends of the fusible links 22, the fusible links 22 must extend through the narrow opening 34 in the fire-resistant barrier wall 12 which separates the sealed fire-resistant splice chamber 14 and the distribution chamber 16. Referring to FIGS. 4a, 4b and 4c, there is shown a sequence of inserting the fusible links 22 into the narrow opening 34 after automatic termination. Referring to FIG. 4a the terminated fusible links 22 are inserted into the wiring access slot 38, which is at least as wire as a single fusible link 22. It can be seen in FIG. 4b, that the fusible links 22 collect in the primary aperture 36. After all of the corresponding fusible links 22 have been collected in the primary aperture 36, a vinyl tape 42, cable tie, slotted rubber grommet, grommet strip, or other suitable device is used to contain and protect the fusible links 22 as a group or bundle. Optionally a plug (not shown) may be used to seal the wiring access slot 38.

Referring to FIG. 5, there is shown an edge view of the fire-resistant barrier wall 12, where the wiring access slot 38 is formed by bending the fire-resistant barrier wall 12. A tab 44, permits access for wiring to the primary aperture 36. After all of the corresponding fusible links 22 have been collected in the primary aperture 36, the wiring slot 38 may be closed by bending the tab 44 flush with the fire-resistant barrier wall 12, or a plug (not shown) may be used to seal the wiring access slot 38.

Numerous modifications and alternative embodiments of the invention will be apparent to those skilled in the art in view of the foregoing description. This includes but is not limited to a variety of primary aperture shapes as well as cable containment and protection devices. Further, the fusible links may be terminated on one end, automatically drawn through the wiring access slot and into the primary aperture, before termination on the other end. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A building entrance protector assembly for interconnecting outside plant wiring to customer premises wiring through fusible links, the building entrance protector assembly comprising:
    a chamber;
    an input termination device for connecting to the outside plant wiring;
    an output termination device for connecting to the customer premises wiring; and,
    a barrier wall having a primary aperture and a wiring access slot, said barrier wall dividing said chamber, said primary aperture adapted to collect a group of fusible links therein and to seal said barrier wall with said group of fusible links within said barrier wall;
    wherein said barrier wall separates said input termination device from said output termination device so that the fusible links can be connected between said input termination device and said output termination device without having to first feed through said primary aperture and wherein the fusible links are first fed through said wiring access slot.

2. The building entrance protector assembly as recited in claim 1 wherein said barrier wall is comprised of a fire-resistant material.

3. The building entrance protector assembly as recited in claim 1 wherein said barrier wall further comprises a bendable tab capable of closing said wiring access slot wherein closing said bendable tab provides means for maintaining integrity of said barrier wall.

4. The building entrance protector assembly as recited in claim 1 wherein said primary aperture is defined by a circular shape.

5. The building entrance protector assembly as recited in claim 1 wherein said primary aperture is defined by a shape having rounded corners.

6. The building entrance protector assembly as recited in claim 1 further comprising a surge connector port wherein the fusible links are connected between said input termination device and said output termination device through said surge connector port.

7. The building entrance protector assembly as recited in claim 6 wherein said surge connector port is separated from said input termination device by said barrier wall.

8. A method of connecting an input wire termination device to an output wire termination device in a building entrance protector assembly, the method comprising the steps of:
    providing a group of fusible links having a first end and a second end;
    terminating said first end of one of said group of fusible links to a connector of said input termination device;
    terminating said second end of said one of said group of fusible links to a connector of a connector port;
    passing said group of fusible links through a wiring access slot into a primary aperture in a barrier wall;
    collecting said group of fusible links within said primary aperture;
    sealing said barrier wall with said group of fusible links within said barrier wall; and,
    isolating said input termination device from said connector port with said barrier wall;
    wherein said group of fusible links are contained by said primary aperture.

9. The method as recited in claim 8 wherein said barrier wall is comprised of a fire-resistant material.

10. The method as recited in claim 8 further comprising the step of closing said wiring access slot when said group of fusible links are contained by said primary aperture wherein closing said wiring access slot provides means for maintaining integrity of said barrier wall.

11. The method as recited in claim 10 wherein the step of closing said wiring access slot further comprises bending a tab on said barrier wall.

12. In a building entrance protector having an input wire termination device and an output wire termination device, a barrier wall for isolating fusible link connections between the input wire termination device and the output wire termination device, the barrier wall comprising:

a fire-resistant plate for isolating the input wire termination device from the output wire termination device within the building entrance protector, said fire-resistant plate having a narrow opening;

said narrow opening having a primary aperture and a wiring access slot;

wherein said wiring access slot permits insertion of terminated fusible links into said primary aperture which is capable of containing the fusible link connections between the input wire termination device and the output wire termination device and wherein the fire-resistant plate is sealed with the terminated fusible links within the fire-resistant plate.

13. The barrier wall in a building entrance protected as recited in claim 12 wherein said barrier wall is comprised of a fire-resistant material.

14. The barrier wall in a building entrance protector as recited in claim 12 wherein said barrier wall further comprises a bendable tab capable of closing said wiring access slot wherein closing said bendable tab provides means for maintaining integrity of said barrier wall.

15. The barrier wall in a building entrance protected as recited in claim 12 wherein said primary aperture is defined by a circular shape.

16. The barrier wall in a building entrance protected as recited in claim 12 wherein said primary aperture is defined by a shape having rounded corners.

\* \* \* \* \*